May 9, 1967  E. FUNK  3,318,531
IRRIGATION PIPE PROPELLING APPARATUS
Filed Aug. 9, 1965  3 Sheets-Sheet 1
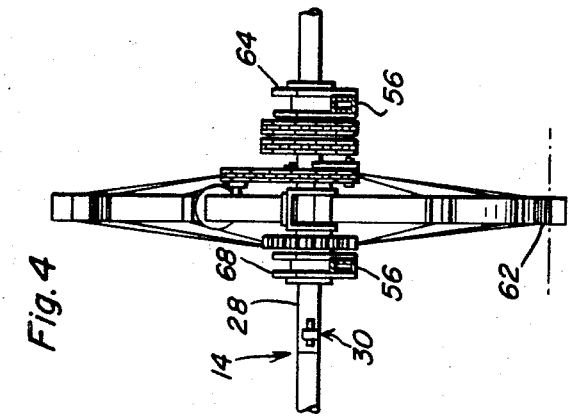
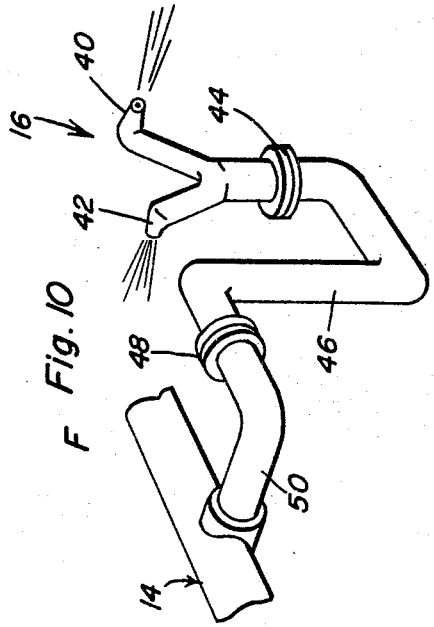
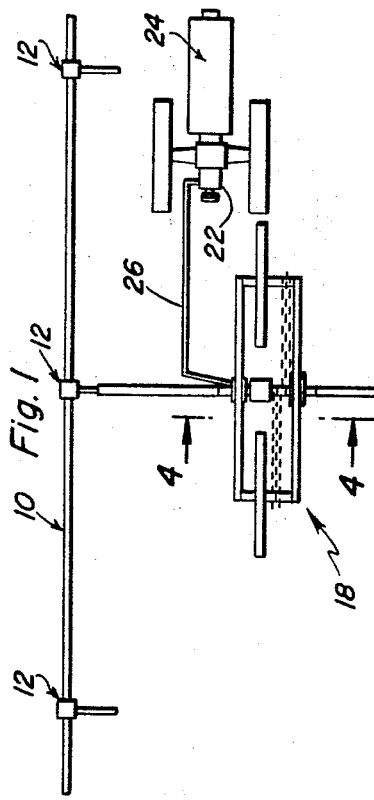
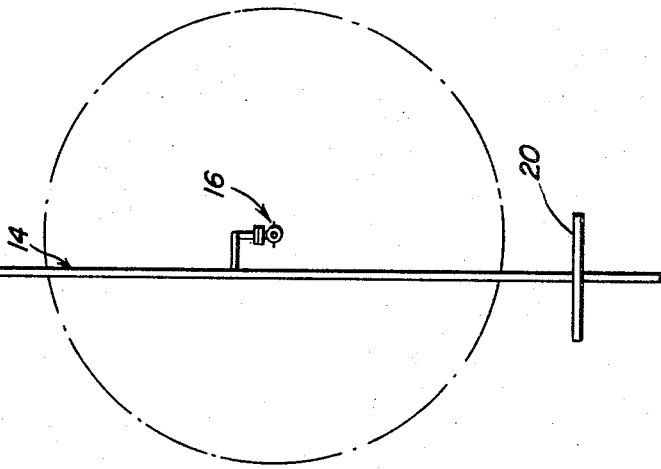
*Elmer Funk*
INVENTOR.
BY *Clarence A. O'Brien*
*and Harvey B. Jacobson*
Attorneys

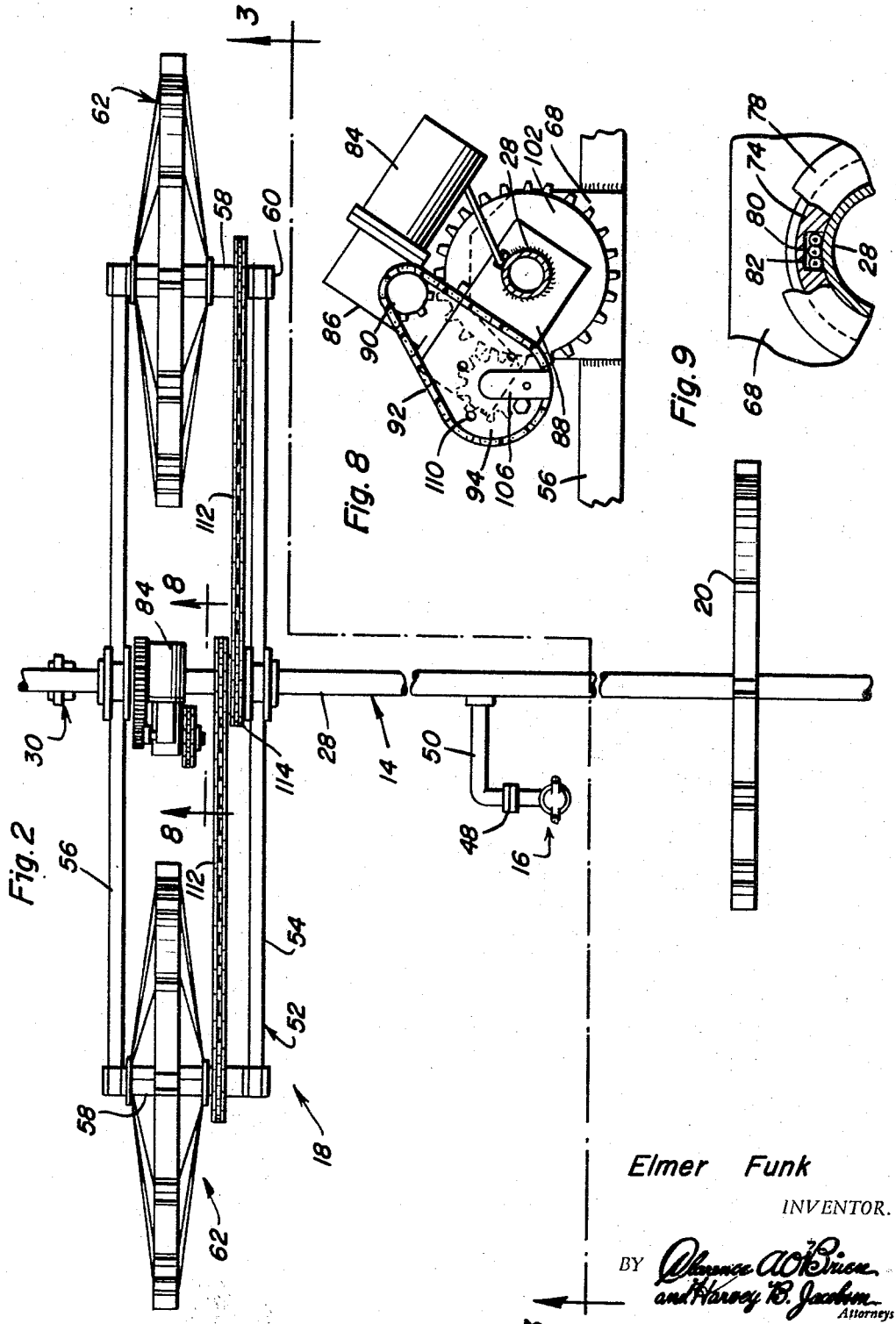

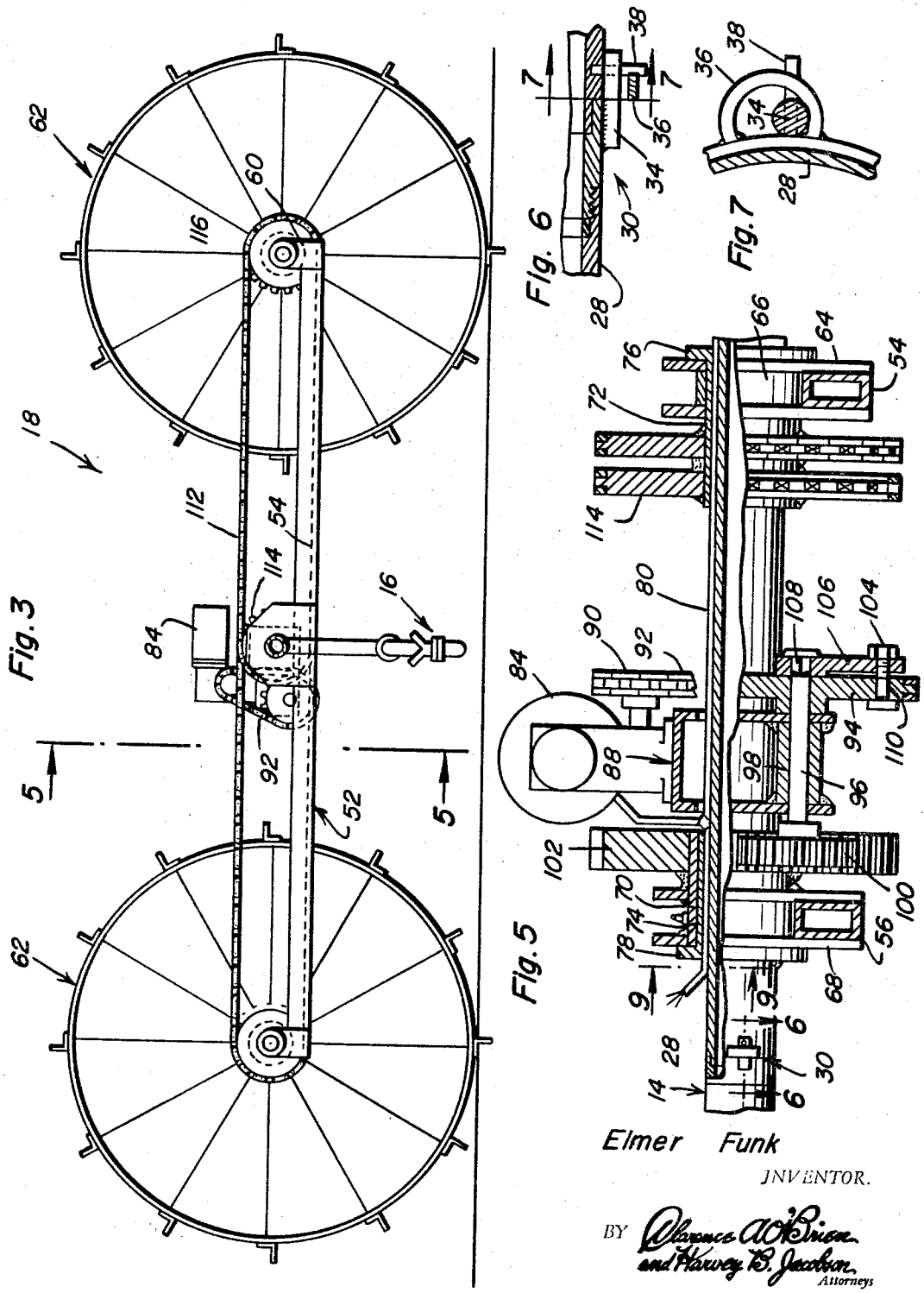

United States Patent Office 3,318,531
Patented May 9, 1967

3,318,531
IRRIGATION PIPE PROPELLING APPARATUS
Elmer Funk, Aberdeen, Idaho, assignor of one-third each to Elmer A. Funk and Harold A. Funk, both of Aberdeen, Idaho
Filed Aug. 9, 1965, Ser. No. 478,313
14 Claims. (Cl. 239—212)

This invention relates to field irrigation systems and more particularly to apparatus for moving elongated irrigation conduits from one location to another.

A primary object of the present invention is to provide a plurality of propelling units for elongated irrigation conduits all of which are adapted to be simultaneously energized from a single source of electrical energy in order to move the irrigation conduit between different locations at which it is coupled to a stationary water supply conduit. The arrangement of the present invention therefore avoids the use of any elongated drive shafts for transferring motive energy from one propelling unit to another nor does it rely upon separate and independently energized propelling units. Torsional stress problems that arise when mechanically transferring motive energy is therefore eliminated. At the same time the likelihood of any damage to the irrigation conduit being propelled, is minimized.

A further object of the present invention is to provide apparatus for propelling elongated irrigation conduits by propelling units which impart rotation to the conduit itself.

A still further object of the present invention is to provide a propelling unit for irrigation conduit sections which feature a drive motor secured to the conduit section rotatably supported by a vehicle frame having traction wheels. A planetary gear arrangement is provided for drivingly interconnecting the output of the drive motor with a fixed reaction gear secured to the vehicle frame so that upon energization of the motor, torque will be exerted on the motor casing to impart rotation to the conduit section to which it is secured. The conduit section is therefore drivingly interconnected with the traction wheels so as to propel the conduit as it is being rotated.

An additional object of the present invention in accordance with the foregoing objects is to provide propelling units for interconnected conduit sections, each propelling unit having facilities for selectively changing the angular relationship between the drive motor and the planetary gear by means of which the drive motor is rendered effective to impart rotation to the conduit section. Thus, when all of the drive motors of the propelling units are simultaneously energized, transmission of torque to the conduit sections at selected propelling units may be delayed by adjusted amounts in order to compensate for differences in loading at the respective propelling units because of the terrain over which the irrigation conduit is being propelled.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a simplified top plan view of some of the apparatus associated with the irrigation system of the present invention;

FIGURE 2 is an enlarged top plan view of a portion of the apparatus showing one of the propelling units;

FIGURE 3 is a side elevational view of the propelling unit as viewed from a plane indicated by section line 3—3 in FIGURE 2;

FIGURE 4 is a sectional view taken substantially through the plane indicated by section line 4—4 in FIGURE 1;

FIGURE 5 is a partial sectional view taken through a plane indicated by section line 5—5 in FIGURE 3 with parts broken away and shown in section;

FIGURE 6 is an enlarged partial sectional view taken substantially through a plane indicated by the section line 6—6 in FIGURE 5;

FIGURE 7 is a partial sectional view taken substantially through a plane indicated by section line 7—7 in FIGURE 6;

FIGURE 8 is a partial sectional view taken substantially through the plane indicated by the section line 8—8 in FIGURE 2 but showing the drive mechanism in another phase position;

FIGURE 9 is a partial sectional view taken substantially through a plane indicated by section line 9—9 in FIGURE 5;

FIGURE 10 is an enlarged partial perspective view of a portion of the apparatus associated with the irrigation system of the present invention.

Referring now to the drawings in detail it will be observed from FIGURE 1 that the present invention pertains to an irrigation system employing a stationary water supply conduit 10 which extends through a field to be irrigated. The water supply conduit mounts at spaced locations therealong, pipe connecting valve units 12 to which one axial end of an elongated irrigation conduit 14 is adapted to be connected in any suitable manner. Thus, water under pressure may be conducted through the conduit 14 when it is coupled to the water supply conduit 10 to discharge water at a plurality of locations through the sprinkler head assemblies generally referred to by reference numeral 16.

In order to support the elongated irrigation conduit 14 above the ground and to move it from one location to another in a direction parallel to the water supply conduit 10, a plurality of propelling units 18 are provided through which the conduit 14 extends. The number of such propelling units utilized will depend of course upon the length of the conduit 14. Also, supporting wheel members 20 are secured to the conduit 14 intermediate the propelling units 18. It will therefore be apparent that after the conduit 14 is uncoupled from a valve connecting assembly 12 at one location, it may be moved to the next location along the water supply conduit 10 by simultaneously energizing all of the propelling units 18. The propelling units are simultaneously energized from a common source of electrical energy in the form of a generator 22 for example, which may be mounted on the tractor 24 so that it may be moved along the water supply conduit when the electrical connecting cable 26 has been extended to substantially its full length. As will be hereafter described, the electrical cable through which electrical energy is supplied to each of the propelling units, is rotated together with the conduit 14. Accordingly, the connecting cable 26 must be capable of rotation about its longitudinal axis and must therefore be connected to the output of the generator 22 through any suitable slip ring connection.

Referring now to FIGURES 2, 5, 6 and 7, it will be observed that the conduit 14 is made up of a plurality of pipe sections 28 which are interconnected by lost motion couplings 30. These couplings are provided in order to relieve torsional stress in the conduit 14 which arises because of the driving torque applied to the conduit at spaced locations by the propelling units 18. Each of the lost motion couplings therefore includes a tubular coupling section 32 threadedly secured to one adjacent end of a pipe section and having a connecting rod 34 welded thereto which axially projects over the end of an adjacent pipe section. Secured to the adjacent end of the pipe section over which the connecting rod 34 extends is a ring element 36 through which the rod 34 extends. The ring element will therefore limit angular displacement between the coupling section 28 and the pipe section to which the ring element 36 is connected as by welding. Axial disassembly of the coupling section 32 from the pipe section may be prevented in any suitable manner as by means of the assembly pin 38 abutting the ring element.

Inasmuch as the conduit 14 is rotated about its longitudinal axis when it is propelled by means of the propelling units 18, vertical orientation of the sprinkler heads 16 must be maintained for all angular positions of the conduit 14. Referring therefore to FIGURE 10 in particular, it will be noted that the sprinkler head includes a pair of oppositely directed nozzle portions 40 and 42 operative in response to discharge of water therefrom to impart rotation to the sprinkler head about a vertical axis. Accordingly, the sprinkler head is rotationally mounted by the swivel coupling 44 to a connecting conduit section 46. The conduit section 46 is rotatably mounted by means of a swivel coupling 48 about a horizontal axis on an outlet elbow 50 secured to the conduit 14. It will therefore be apparent that the weight of the connecting conduit section 46 which mounts the sprinkler head 16, will maintain the sprinkler head in a vertical position for all angular positions to which the conduit 14 displaces the outlet elbow 50. Further, the horizontal axis established through the swivel coupling 48 is aligned with the plane common to both of the discharge nozzle portions 40 and 42 so that the reaction thrust produced by discharge of water from the nozzle portions will not produce any moment about the horizontal axis established through the swivel coupling 48. Thus, the sprinkler head will be maintained in a vertical position as it is rotated about the vertical axis established through the swivel coupling 44 regardless of the angular position assumed by the irrigation conduit 14 when it is coupled to the water supply conduit 10.

Referring now to FIGURES 2, 3, 4 and 5, it will be observed that each of the propelling units 18 includes a frame assembly 52 formed by a pair of parallel spaced frame members 54 and 56 interconnected at opposite longitudinal ends by wheel axles 58 rotatably mounted by journal bearings 60 secured to the opposite longitudinal ends of the frame members 54 and 56. Secured to each of the axles 58, are traction wheels 62 which support and propel the frame assembly 52 above the ground. The frame assembly rotatably receives a pipe section 28 intermediate the traction wheels 62. Toward this end, a pair of bracket plates 64 are secured to the frame member 54 and extend upwardly therefrom to mount therebetween a journal sleeve 66. Similarly, the frame member 56 has a pair of bracket plates 68 secured thereto for mounting an axially elongated journal sleeve 70 in alignment with the journal sleeve 66. Secured to the pipe section 28 as by welding are axially spaced tubular bearing members 72 and 74 journaled in the sleeves 66 and 70 to rotatably mount the pipe section about its longitudinal axis. The tubular bearing members are also provided with flange portions 76 and 78 respectively abutting the bracket plates 64 and 68 in order to resist axial thrust. An electrical cable 80 containing, for example, three polyphase voltage lines, is mounted on the pipe section 28 for rotation therewith and therefore extends through channels 82 formed in the tubular bearing members 74 and 72, as more clearly seen in FIGURE 9. Electrical energy may therefore be supplied to a three phase reversible electric motor 84 which is also rotatable with the conduit section 28.

With continued reference to FIGURES 2, 3 and 5, it will be noted that the casing of the motor 84 is secured to the housing of a self-locking reduction gear unit 86 with which the motor is associated. The motor is thereby fixedly mounted by a support member 88 on the pipe section 28 and is drivingly connected by the reduction gear unit 86 to an output sprocket gear 90. The output sprocket gear is drivingly connected by the sprocket chain 92 to a drive member 94 loosely mounted on a planet pinion shaft 96 which in turn is rotatably mounted on the support member 88 by the sleeve bearing 98. Connected to one end of the shaft 96 is a planetary pinion gear 100 which is in mesh with an external, reaction gear 102 secured as by welding to one axial end of the sleeve 70. Accordingly, the external gear 102 is fixed to the frame assembly 52 so that when rotation is imparted to the planetary pinion gear 100 it will cause the support member 88 to walk around the gear member 102. Rotation is imparted to the planetary pinion gear 100 when the drive motor 84 is energized. Accordingly, the drive sprocket member 94 which is drivingly connected to the motor 84 may be selectively coupled by means of a removable coupling bolt assembly 104 to the arm 106 fixed to the planetary pinion shaft 96 at its squared end 108. The coupling bolt assembly 104 extends through one of a plurality of apertures 110 formed in the drive member 94 for this purpose as more clearly seen in FIGURE 8. With the fastener bolt assembly 104 extending through both the arm 106 and the drive member 94 as shown in FIGURE 5, energization of the motor 94 will instantaneously transmit driving torque to the conduit section 28. Should it be desired, however, to adjustably delay transfer of torque to the pipe section following energization of the motor 84, the coupling bolt assembly 104 may be removed and placed through another aperture 110 in the drive member 94 angularly spaced from the arm 106 so that the drive member must be angularly rotated by a predetermined amount before the coupling assembly 104 abuts the arm 106 as shown in FIGURE 8 in order to transfer torque in one direction to the pipe section 28 through the planetary gearing. The frame assembly 52 is propelled when the pipe section is rotated because of the driving connection established between the pipe section and the traction wheels 62 by the sprocket chains 112 which interconnect the sprocket gears 114 secured to the tubular bearing member 72 and the sprocket gears 116 secured to the drive axles 58 associated with the traction wheels.

From the foregoing description the construction, operation and utility of the pipe propelling apparatus of the present invention will be apparent. It will therefore be appreciated that the elongated irrigation conduit 14 made up of a plurality of pipe sections 28 interconnected by lost motion couplings 30 may be propelled in a direction generally parallel to the stationary water supply conduit 10 by simultaneous energization of the drive motors 84, associated with the respective propelling units 18, from a single source of electrical energy 22. The drive motors are secured to the conduit sections at each of the propelling units for rotation therewith and are operative to impart rotation to the conduit sections by means of a planetary gear arrangement having fastener means 104 through which the transfer of motion to the pipe section 28 may be delayed as aforementioned. Accordingly, when propelling a rather long conduit 14 over sloping terrain, for example, it is possible to delay transfer of torque to the pipe sections at selected locations that are less heavily loaded in order to avoid excessive torsional stress that would otherwise develop if torque were simultaneously applied to all pipe sections at the same time. Thus, the arrangement of the present invention will avoid problems heretofore encountered when utilizing independently powered propelling units or propelling units to which power is mechanically transferred from a common source of motive power. Also, it will be apparent that the arrangement of the present invention, in addition to being more reliable and efficient in operation, will be more easily repaired and maintained.

The foregoing is considered as illustrative only of the principles of the invention. Further, since numerous modifications and changes will readily occur to those

What is claimed as new is as follows:

1. In an irrigation system having an elongated conduit adapted to be connected at a plurality of spaced locations to a supply pipe, means for propelling said conduit from one of said locations to another comprising a source of electrical energy, at least one propelling frame rotatably supporting the conduit, a drive motor rotatably mounted by the frame, gear means drivingly connecting the conduit to the motor for rotation thereof in response to energization of the motor, electrical conductor means fixedly mounted on the conduit and electrically connecting the motor to the source of electrical energy, and traction wheel means mounted by the frame and drivingly connected to the conduit for movement thereof between said locations when the motor is energized by said source of electrical energy.

2. The combination of claim 1 including a discharge nozzle, an outlet connection mounted on the conduit through which fluid is conducted for discharge from the nozzle, and means movably mounting the nozzle on said outlet connection for maintaining the nozzle orientated in a vertical position for all angular positions of the conduit.

3. The combination of claim 2 wherein said nozzle includes a pair of discharge portions from which fluid is discharged in a discharge plane, said movable mounting means including means rotatably mounting the nozzle about a rotational axis for rotation of the nozzle in response to discharge of fluid from said discharge portions, and orientating coupling means rotatably mounting the nozzle on the outlet connection about an axis disposed in said discharge plane.

4. The combination of claim 3 including adjustable coupling means operatively connected to the motor and the gear means for selectively changing the angular driving relationship between the motor and the conduit to delay movement of the propelling frame following energization of the motor.

5. The combination of claim 4 wherein said gear means includes an external gear fixedly mounted on the propelling frame in coaxial relation to the conduit, support means secured to the conduit and mounting the motor for rotation therewith, a planetary gear rotatably mounted by the support means in meshing engagement with said external gear and a drive member driven by the motor and connected by said adjustable coupling means to the planetary gear.

6. The combination of claim 1 including adjustable coupling means operatively connected to the motor and the gear means for selectively changing the angular driving relationship between the motor and the conduit to delay movement of the propelling frame following energization of the motor.

7. The combination of claim 6 wherein said gear means includes an external gear fixedly mounted on the propelling frame in coaxial relation to the conduit, support means secured to the conduit and mounting the motor for rotation therewith, a planetary gear rotatably mounted by the support means in meshing engagement with said external gear, and a drive member driven by the motor and connected by said adjustable coupling means to the planetary gear.

8. The combination of claim 1 wherein said gear means includes an external gear fixedly mounted on the propelling frame in coaxial relation to the conduit, support means secured to the conduit and mounting the motor for rotation therewith, a planetary gear rotatably mounted by the support means in meshing engagement with said external gear, and a drive member driven by the motor, and connected to the planetary gear.

9. In an irrigation system having a supply pipe and an elongated conduit adapted to be connected to the supply pipe at a plurality of spaced locations, means for moving the conduit from one of said locations to another comprising a plurality of propelling units supporting said conduit, common electrical means for simultaneously energizing all of said propelling units, said propelling units including motor means energized for propelling the conduit, and means for delaying transfer of motion to the conduit following energization of the motor means in accordance with the loading on the conduit at the respective propelling units.

10. The combination of claim 9 wherein said conduit includes a plurality of pipe sections and lost motion coupling means interconnecting said pipe sections for relieving torsional stress along the conduit between the propelling units.

11. The combination of claim 10 wherein each of said propelling units further includes a frame mounting the motor means, planetary gear means drivingly connecting the motor means to the conduit for imparting rotation thereto, and traction wheel means mounted by the frame and driven by the conduit for movement of the conduit substantially parallel to the supply pipe.

12. The combination of claim 9 wherein each of said propelling units further includes a frame mounting the motor means, planetary gear means drivingly connecting the motor means to the conduit for imparting rotation thereto, and traction wheel means mounted by the frame and driven by the conduit for movement of the conduit substantially parallel to the supply pipe.

13. A propelling unit for an irrigation pipe section comprising a frame having a bearing sleeve rotatably mounting said pipe section, a gear member secured to said sleeve, a support secured to the pipe section adjacent to the sleeve, a planetary gear rotatably mounted by the support in mesh with the gear member, an electric motor fixedly mounted on the support, a drive member rotatably mounted by the support, means for drivingly connecting the drive member to the planetary gear in angularly adjusted relation thereto, traction wheel means rotatably mounted by the frame, reduction gear means drivingly connecting the motor to the drive member for imparting rotation to the pipe section, and means drivingly connecting the pipe section to the traction wheel means for propelling the frame in response to rotation of the pipe section.

14. The combination of claim 13 including a tubular bearing member secured to said conduit and received within the bearing sleeve, and an electrical cable connected to the motor, said electrical cable extending through a channel formed internally of the tubular bearing member for rotation with the pipe section and the support secured thereto.

References Cited by the Examiner

UNITED STATES PATENTS

| | | | |
|---|---|---|---|
| 2,582,416 | 1/1952 | Cornelius | 239—212 |
| 2,800,364 | 7/1957 | Dick et al. | 239—212 |
| 2,946,515 | 7/1960 | Jensen | 239—212 |
| 3,002,697 | 10/1961 | Jones | 239—212 |
| 3,045,922 | 7/1962 | Jensen | 239—212 |
| 3,143,298 | 8/1964 | Jones | 239—212 |

EVERETT W. KIRBY, Primary Examiner.